United States Patent [19]

Koizumi et al.

[11] Patent Number: 4,772,253
[45] Date of Patent: Sep. 20, 1988

[54] ENDLESS BELT

[75] Inventors: Yutaka Koizumi; Hidetoshi Yano, both of Yokohama; Hideki Akiyoshi, Numazu, all of Japan

[73] Assignee: Ricoh Company, Ltd., Tokyo, Japan

[21] Appl. No.: 36,355

[22] Filed: Apr. 9, 1987

[30] Foreign Application Priority Data

Apr. 15, 1986 [JP] Japan .................. 61-055425[U]

[51] Int. Cl.⁴ .............................. F16G 1/12
[52] U.S. Cl. .................. 474/266; 355/3 BE
[58] Field of Search .............. 476/266–272; 355/3 BE

[56] References Cited

U.S. PATENT DOCUMENTS 4,155,639  5/1979  Beserano et al. ............ 355/3 BE
4,606,955  8/1986  Eastman et al. ............. 355/3 BE

OTHER PUBLICATIONS

Adamo et al., Welded Xerographic Belts, Nov./Dec. 1977, vol. 2, No. 6, p. 53.

*Primary Examiner*—Thuy M. Bui
*Attorney, Agent, or Firm*—Oblon, Fisher, Spivak, McClelland & Maier

[57] ABSTRACT

A wide seamless endless belt. A belt comprising a wide seamless endless-belt-like sheet metal 10 to 50 μm, and a lining layer made of flexible material provided on the inside surface thereof and carrying a mechanical force required for belt. This endless belt is used as a substrate of a photosensitive belt for an electrostatic photographic copying machine.

7 Claims, 1 Drawing Sheet

ENDLESS BELT

FIELD OF THE INVENTION AND RELATED ART STATEMENT

This invention relates to a wide endless belt.

For an endless belt thin (around 100 μm) and wide (over 300 mm) such as the belt-type photosensitive memeber for the electrostatic photographic copying machine, has been widely used an endless belt which is made of sheet-like members whose substrate is polyester or other resin films, which seams jointed by high frequency bonding, etc. An endless belt which has such seams may sometimes introduce functional defects into the machine because of the seam depending on its usage. For instance, when a seamed endless belt is used for a photosensitive belt for an electrostatic photographic copying machine, an image starting position must be controlled for the image fixing region not to include any seam, thus necessitating seam detect means and image position control means, resulting in a complicated system and higher cost. Further, the seam may accelerate cleaning blade's wear, and damage the blade, which in turn introduces some damage into the photosensitive member or causes poor cleaning, resulting in short life of the machine. Therefore, there has long been a great demand for a belt without seam, or a so-called seamless belt.

For this demand, a seamless belt with the nickel-plate layer separated from the outer surface of a cylindrical mold has been developed for commercial application as a belt photosensitive member for a copying machine, or as a separation transfer belt which separates a transfer paper on which a toner image formed on a photosensitive member is transferred, from the photosensitive member, and transfers as the paper to a fixing device. But, because a mechanical strength required for an endless belt depends on a simple layer of nickel or other metals, the seamless belt needs to have a considerable thickness, resulting in poor flexibility, failure to bend on a small curvature, and time-consuming and expensive forming. And also, a metal belt has a potential for slipping between the drive roller because its friction coefficient is smaller than a synthetic resin belt.

OBJECT AND SUMMARY OF THE INVENTION

In view of the above, it is the object and purpose of the invention to provide a seamless endless belt which is flexible, warrants long life and is less likely to slip.

In a seamless endless belt according to the invention, the aforesaid object can be accomplished by providing an endless-belt-like sheet metal 10 to 50 μm thick and wide, and a lining made of flexible material and thick enough to carry a mechanical force required for a belt on the inside surface the aforesaid sheet metal.

BRIEF DESCRIPTION OF THE DRAWINGS

In the accompanying drawings, there are shown illustrative embodiments of the invention which these and other of its objectives, novel features and advantages will be readily apparent.

In the drawings.

DETAILED DESCRIPTION OF PREFERRED EMBODIMENTS

Figure 1:
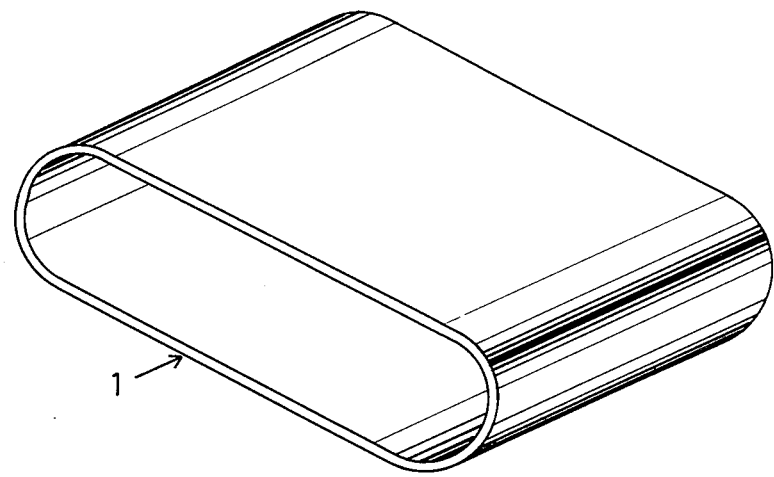
FIG. 1 is a perspective view showing an appearance of an embodiment according to the invention adapted for a belt-like photosensitive member.
Figure 2:
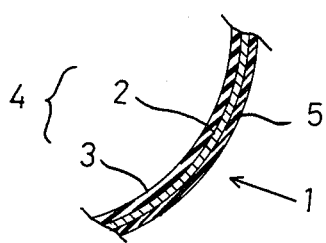
FIG. 2 is a fragmentally enlarged sectional view of the embodiment in FIG. 1.

As shown in FIG. 1, a photosensitive endless belt 1 according to the invention is constructed as a seamless endless belt, which, as shown in FIG. 2, comprises a seamless and endless metal belt layer 2 made of a wide sheet metal fabricated by separating a nickel plated layer as described above and having a lined synthetic resin, rubber or other flexible material thereinside, a lining layer 3 thick enough to carry a force required for an endless belt and lined on the whole inside surface of the aforesaid metal belt layer 2 (to make a combination, referred to a belt substrate 4, of the aforesaid metal belt layer 2 and the aforesaid lining layer 3), and a build-up photosensitive layer 5 thereon.

Because the aforesaid lining layer 3 carries the mechanical force required for the belt, the aforesaid metal belt layer 2 is desirable to be as thin as possible (around 10 to 50 μm) unless it comprises physical properties required for the metal belt layer 2, its resistance against a force working in the process of forming the lining layer 3, and its mechanical strength limiting belt elongation.

As the conventional photosensitive member, the photosensitive layer 5 is made by building up, for instance, an under layer, a carrier generate layer and a carrier transfer layer in this order on the metal layer 2.

Figure 3:
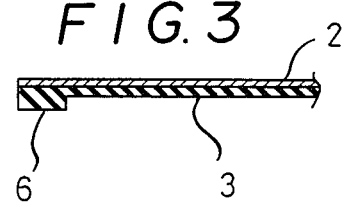
FIGS. 3 and 4 are sectional views respectively showing end portions of other embodiments according to the invention.

The lining layer 3 can be made by a variety of means such as coating, molding, bonding or adhesion. Because of possible thickness difference between its left and right sides and inevitable errors in installing the endless belt 1 on rollers, the endless belt 1 must have a "shift" while being driven. Therefore, the belt commonly has a shift limiting means 6 which projects inwardly on the both ends to limit the shift of the belt by butting against the both side ends of the rollers. As shown in FIG. 3, the shift limiting means 6 may be intergrally formed at the same time when the lining layer 3 is being made. It is desirable that the lining layer 3 has an electrically low resistance, when the photosensitive member 1 can easily grounded through a belt driving roller or a tension roller, thus eliminating the need for a brush in sliding contact with the metal layer.

Figure 4:
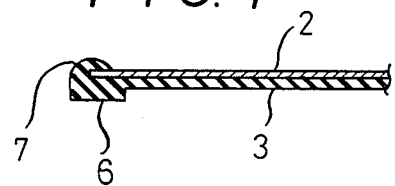

With an endless belt according to the invention, the metal layer 2 can be so thin as 10 to 50 μm, while the edges may be so sharp as a knife edge. Therefore, it is desirable that as shown in FIG. 4, an end protection piece 7 be formed on the ends of the lining layer 3 to cover the edges of the metal layer 2 so as to prevent from cutting hands in handling.

As described above, since a metal layer 2 of an endless belt 1 according to the invention is extremely thin and a lining layer 3 responsible for strength is made of flexible material, the belt has an improved flexibility so as to apply a small diameter of driving and support rollers. A lining layer of rubber or synthetic resin with a large friction coefficient can protect against belt slip from the rollers. Without seam, for instance when used as a photosensitive belt, the belt has no restriction for imaging position, thus resulting in easy control and an improved copying speed, as well as in prevention of life deterioration associated with the seam.

The lining layer can be made, as described above, by coating, molding, bonding, adhesion or other methods;

with coating, generally resin solvent is coated with brushes or rollers, or sprayed with air gun, and may be coated by the so-called dipping method in which an outer surface of a belt is covered with a protective layer to immerse the whole belt, with molding, for instance molten resin is dicharged from linear or ring slit, or a film lining is formed inside or a method like a centrifugal casting may be adopted, with bonding, the inner film layer with the cutting or butting line oblique or notched is not necessarily seamless and easy in machining, and also film-like tapes slender in comparison with the belt width may be bonded tape by tape spirally, and with adhesion, in the same way as the above bonding.

On the other hand, in the embodiments according to the invention the seamless-like metal thin layer is described as a relatively long one, but it is not necessarily limited to the long one but it may be formed into an extremely short one, in other words, a small-size thin-walled drum.

In this case, a lining layer is required to be strong and precise enough to maintain the cylindricity of drum, and the material and thickness can be arbitrarily selected according to its purpose.

For instance, in making a small-sized drum some 25 mm in diameter, a drum with a metal layer 20 $\mu$m and a lining layer over 0.1 mm may be used as a photosensitive drum substrate, which also, as required, may be used for a photosensitive drum flexible enough to be able to change locally its shape to cope with developing in a developing roller having a hard surface.

If this material is used as a substrate for the developing roller, it can cope with a hard photosensitive drum.

In general, a seamless belt made of metal thin layer is fabricated by forming a metal thin layer, for instance by plating, on the outer surface of a cylindrical mold with a diameter equal to the inner diameter of the belt and by separating the plated layer into a seamless belt. In providing a lining layer on the inside surface of a belt like the embodiment, first forming a metal layer on the inner circumference of a cylindrical mold, providing a lining layer on the inner surface of a belt for instance by centrifugal casting, and then separting the lining layer on the inside surface of a belt like the embodiment, first forming a metal layer on the inner circumference of a cylindrical mold, providing a lining layer on the inner surface of a belt for instance by centrifugal casting, and then separating the lining layer from the inner circumference of the mold will make a belt more precise and easier in working the lining layer.

What is claimed is:

1. An endless belt consisting of:
   only two layers of
   a wide seamless endless-belt-like sheet metal 10 to 50 $\mu$m thick, and
   a lining layer made of flexible material and thick enough to carry a mechanical force required for a belt, and
   said lining layer formed on the inside surface of said sheet metal.

2. An endless belt as claimed in claim 1, wherein said flexible material is synthetic resin.

3. An endless belt as claimed in claim 1, wherein said flexible material is rubber.

4. An endless belt as claimed in claim 1, wherein said lining layer is conductive.

5. An endless belt as claimed in claim 1, wherein said lining layer is provided with a belt-shift limiting means projecting inwardly on both side ends thereof.

6. An endless belt as claimed in claim 1, wherein said lining layer is provided with end protective pieces covering top edges of said sheet metal at the both ends thereof.

7. An endless belt consisting of:
   only three layers of
   a wide seamless endless-belt-like sheet metal 10 to 50 $\mu$m thick,
   a lining layer made of flexible material and thick enough to carry a mechanical force required for a belt, formed on the inside surface of said sheet, and
   a photosensitive layer built up on the outer surface of said seamless endless-belt-like sheet metal.

* * * * *